United States Patent
Choi et al.

(10) Patent No.: US 10,260,895 B2
(45) Date of Patent: Apr. 16, 2019

(54) APPARATUS AND METHOD FOR CONTROLLING PATH OF VEHICLE

(71) Applicant: HYUNDAI MOTOR COMPANY, Seoul (KR)

(72) Inventors: Tae Sung Choi, Hwaseong-si (KR); Keon Yup Chu, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/491,122

(22) Filed: Apr. 19, 2017

(65) Prior Publication Data

US 2018/0143028 A1 May 24, 2018

(30) Foreign Application Priority Data

Nov. 23, 2016 (KR) .......................... 10-2016-0156515

(51) Int. Cl.
  *G01C 21/34* (2006.01)
  *G01C 21/20* (2006.01)
(52) U.S. Cl.
  CPC ......... *G01C 21/3415* (2013.01); *G01C 21/20* (2013.01); *G01C 21/3492* (2013.01)
(58) Field of Classification Search
  CPC . G01C 21/3415; G01C 21/20; G01C 21/3492
  (Continued)

(56) References Cited

U.S. PATENT DOCUMENTS 6,324,452 B1 * 11/2001 Ikegaya ................. B62D 1/286
                                                                180/422
6,405,132 B1 *  6/2002 Breed .................... B60N 2/002
                                                                701/117
(Continued)

FOREIGN PATENT DOCUMENTS

JP       2007267340 A   * 10/2007  ........... H04N 19/647
JP         4400173 B2      1/2010
(Continued)

OTHER PUBLICATIONS

Guangming et al., "Development and Implementation of Remote Control System for an Unmanned Heavy Tracked Vehicle," Year: 2007, pp. 663-667.*

(Continued)

*Primary Examiner* — Tuan C To
(74) *Attorney, Agent, or Firm* — Morgan Lewis & Bockius LLP (57) ABSTRACT

An apparatus for controlling a path of a vehicle includes: a path generating processor configured to generate a first path by searching for a path from a current location of the vehicle to a destination and generate a second path by searching for a path from a path deviation prediction area on the first path to the destination based on a request; a path deviation area extracting processor configured to extract the path deviation prediction area based on road attributes on the first path; and a path controller configured to determine whether to generate the second path based on a congestion level of a road around the vehicle and reset a driving path of the vehicle to the second path when path deviation occurs on the extracted path deviation prediction area.

18 Claims, 6 Drawing Sheets

(58) Field of Classification Search
USPC .......................................................... 701/414
See application file for complete search history.

(56) References Cited

U.S. PATENT DOCUMENTS

| | | | | |
|---|---|---|---|---|
| 6,487,501 | B1* | 11/2002 | Jeon | B62D 15/025 180/167 |
| 6,950,746 | B2 | 9/2005 | Yano et al. | |
| 7,363,153 | B2* | 4/2008 | Nam | G01C 21/3415 340/990 |
| 9,816,826 | B2* | 11/2017 | Renz | G01C 21/32 |
| 9,846,050 | B2* | 12/2017 | Myers | G01C 21/3484 |
| 9,909,875 | B2* | 3/2018 | Holm | G01C 21/00 |
| 9,927,248 | B2* | 3/2018 | Spiro | G01C 21/34 |
| 2007/0244635 | A1* | 10/2007 | Asahara | G01C 21/3415 701/416 |
| 2009/0171562 | A1* | 7/2009 | Shimada | G01C 21/3415 701/533 |
| 2010/0094551 | A1* | 4/2010 | Bonanni | B61L 25/025 701/469 |
| 2011/0196565 | A1* | 8/2011 | Collins | A01B 69/007 701/26 |
| 2012/0316725 | A1* | 12/2012 | Trepagnier | G01S 17/023 701/26 |
| 2012/0316772 | A1* | 12/2012 | Han | G01C 21/3492 701/414 |
| 2013/0132426 | A1* | 5/2013 | Park | G06F 17/30424 707/769 |
| 2015/0134185 | A1* | 5/2015 | Lee | B62D 15/0285 701/26 |
| 2015/0258979 | A1* | 9/2015 | Matsunaga | B60W 10/06 701/22 |
| 2016/0117936 | A1* | 4/2016 | Klinger | G08G 1/162 701/3 |
| 2016/0274567 | A1* | 9/2016 | Motohashi | G05B 13/045 |
| 2017/0199525 | A1* | 7/2017 | Albaghajati | G05D 1/0214 |
| 2017/0201681 | A1* | 7/2017 | Picalausa | H04N 1/00 |
| 2017/0300029 | A1* | 10/2017 | Oda | G05B 19/4093 |
| 2018/0051997 | A1* | 2/2018 | Grochocki, Jr. | G01C 21/3446 |

FOREIGN PATENT DOCUMENTS

| | | | |
|---|---|---|---|
| KR | 10-0998321 B1 | 12/2010 | |
| WO | WO-2010143935 A1 * | 12/2010 | G06Q 40/08 |

OTHER PUBLICATIONS

Derong et al., "ON Optimal Path Controller Minimizing Longitudinal and Lateral Deviations after Light Collisions," Year: 2013, pp. 899-904.*

* cited by examiner

APPARATUS AND METHOD FOR CONTROLLING PATH OF VEHICLE

CROSS-REFERENCE TO RELATED APPLICATION

This application is based on and claims the benefit of priority to Korean Patent Application No. 10-2016-0156515, filed on Nov. 23, 2016, in the Korean Intellectual Property Office, the disclosure of which is incorporated herein in its entirety by reference.

TECHNICAL FIELD

The present disclosure relates to an apparatus and a method for controlling paths of vehicles.

BACKGROUND

When a driver enters destination information to a vehicle having an autonomous driving system, the autonomous driving system searches for a path from a current location of the vehicle to a destination, sets a global path, and controls autonomous driving of the vehicle along the set global path.

A vehicle which performs autonomous driving may deviate from a path during its driving based on a congestion level of a road and the like. If detecting that the vehicle deviates from the preset global path while the vehicle drives along the global path, the autonomous driving system searches for a path from the corresponding location to the destination again and may set a global path again based on the found path.

It takes time to search for a path until a global path is set again after the vehicle deviates from a path. Since it is difficult to determine whether the vehicle drives along any path while the autonomous driving system searches for a path again, an unexpected situation may occur.

SUMMARY

The present disclosure has been made to solve the above-mentioned problems occurring in the prior art while advantages achieved by the prior art are maintained intact.

An aspect of the present disclosure provides an apparatus and a method for controlling path of a vehicle to determine whether there is a path deviation prediction area on a preset path, detect path deviation on the corresponding area in advance, and previously search for an alternative path before the path deviation such that the vehicle drives along the alternative path although the vehicle deviates from a path.

The technical problems to be solved by the present inventive concept are not limited to the aforementioned problems, and any other technical problems not mentioned herein will be clearly understood from the following description by those skilled in the art to which the present disclosure pertains.

According to an exemplary embodiment of the present disclosure, an apparatus may include: a path generating processor configured to generate a first path by searching for a path from a current location of the vehicle to a destination and generate a second path by searching for a path from a path deviation prediction area on the first path to the destination, a path deviation area extracting processor configured to extract the path deviation prediction area based on road attributes on the first path when a driving path of the vehicle is set to the first path, and a path controller configured to determine whether to generate the second path based on a congestion level of a road around the vehicle when the vehicle arrives at a range from the extracted path deviation prediction area on the first path and reset the driving path of the vehicle to the second path when path deviation occurs on the extracted path deviation prediction area.

According to another exemplary embodiment of the present disclosure, a method may include: generating a first path by searching for a path from a current location of the vehicle to a destination; extracting a path deviation prediction area based on road attributes on the first path, when a driving path of the vehicle is set to the first path, generating a second path from the extracted path deviation prediction area to the destination based on a congestion level of a road around the vehicle, when the vehicle arrives at a range from the extracted path deviation prediction area on the first path, resetting the driving path of the vehicle along the second path, when path deviation occurs on the extracted path deviation prediction area.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
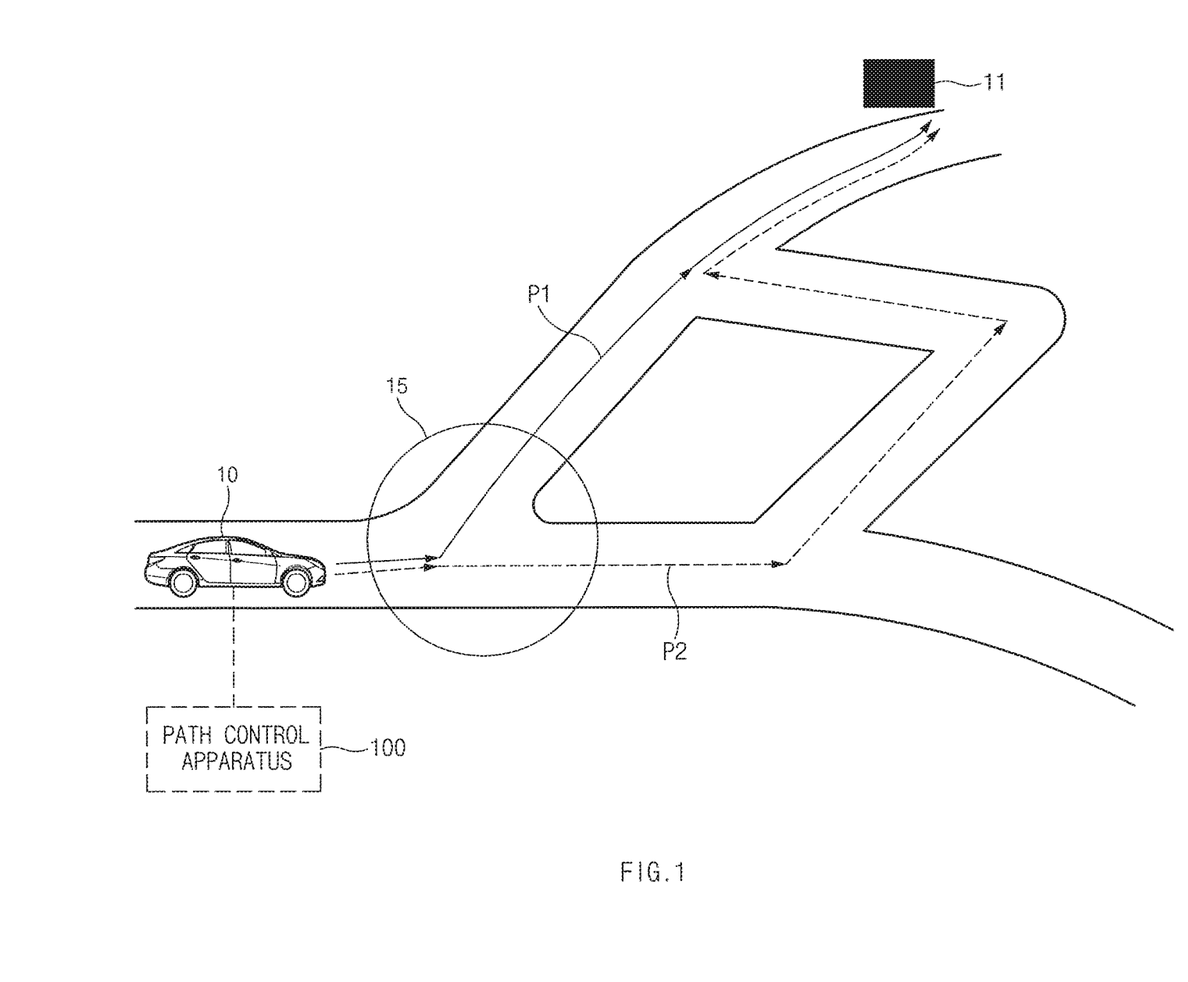
FIG. 1 is a drawing illustrating vehicle to which a path control apparatus of a vehicle is applied, according to an embodiment of the present disclosure.

FIG. 1 is a drawing illustrating a vehicle to which a path control apparatus of a vehicle is applied, according to an embodiment of the present disclosure.

As shown in FIG. 1, if there is an area where attributes information of a road where a vehicle 10 is driven, that is, a path deviation prediction area 15 on a global path P1 set from the vehicle 10 to a destination 11, a path control apparatus 100 of a vehicle 10 may generate an alternative path P2 before the vehicle 10 arrives at the corresponding path deviation prediction area 15. If the vehicle 10 deviates from the global path P1 on the path deviation prediction area 15, the path control apparatus 100 may set the previously generated alternative path P2 to a driving path while searching for a path again such that the vehicle 10 drives to the destination 11.

This path control apparatus 100 may be implemented in the vehicle 10. In this case, the path control apparatus 100 may be integrated with control units in the vehicle 10. Alternatively, the path control apparatus 100 may be implemented to be independent of the control units in the vehicle and may be connected with the control units of the vehicle 10 by a separate connection means. Herein, the path control apparatus 100 may operate in conjunction with an engine and a motor of the vehicle and may operate in conjunction with a navigation device. Also, the path control apparatus 100 may operate in conjunction with a control unit which controls an operation of the engine or motor.

Thus, a detailed description will be given of detailed components of the path control apparatus 100 with reference to FIG. 2.

Figure 2:
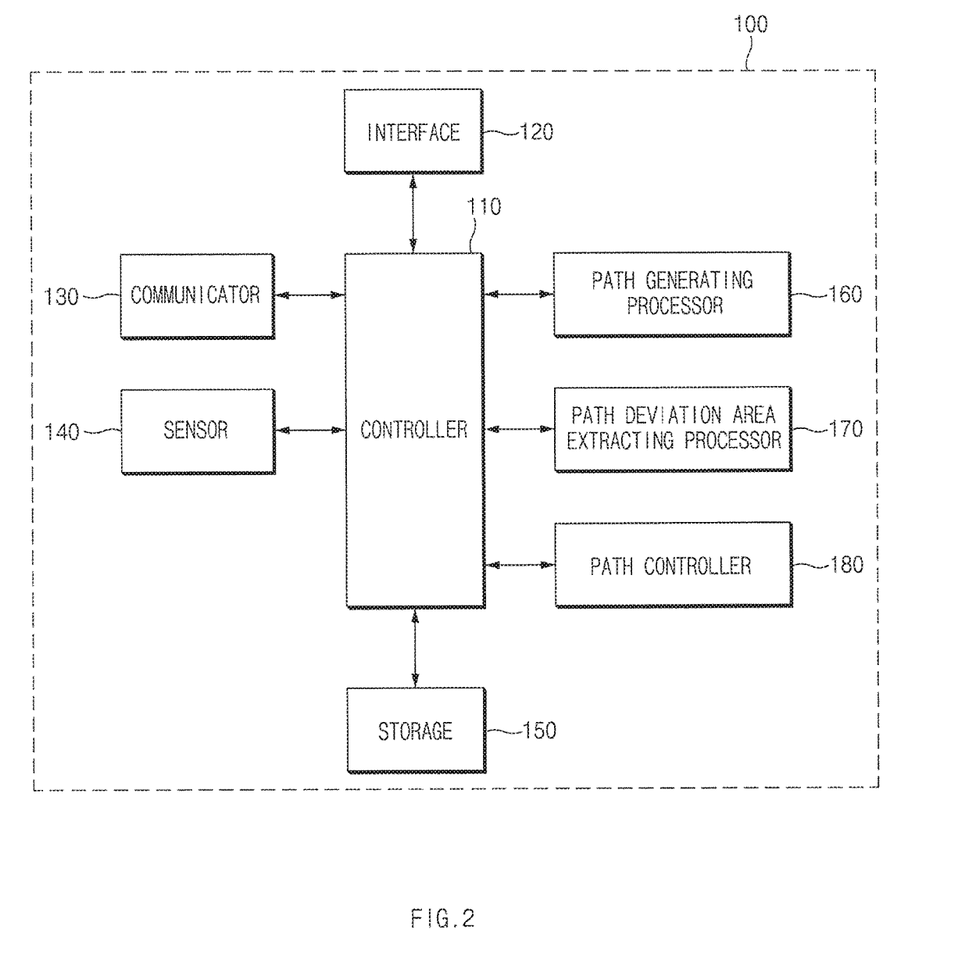
FIG. 2 is a block diagram illustrating a configuration of a path control apparatus of a vehicle according to an embodiment of the present disclosure.

FIG. 2 is a block diagram illustrating a configuration of a path control apparatus of a vehicle according to an embodiment of the present disclosure. Referring to FIG. 2, a path control apparatus 100 of a vehicle 10 may include a controller 110, an interface 120, a communicator 130, a sensor 140, a storage 150, a path generating processor 160, a path deviation area extracting processor 170, and a path controller 180. Herein, the controller 110 may process a signal transmitted between the components of the path control apparatus 100.

In the present disclosure, the controller 110 may include a general electronic control unit (ECU) having hardware and software, in which the hardware consists of a printed circuit board (PCB).

The interface 120 may include an input means for receiving a control instruction from a user and an output means for outputting an operation state, an operation result, and the like of the path control apparatus 100.

Herein, the input means may include a key button and may further include a mouse, a joystick, a jog shuttle, a stylus pen, and the like. Also, the input means may include a soft key implemented on a display of the vehicle 10.

The output means may include the display and may further include a voice output means such as a speaker. In this case, if a touch sensor such as a touch film, a touch sheet, or a touch pad is installed in the display, the display may operate as a touch screen and may be implemented in the form of integrating the input means with the output means.

In this case, the display may include at least one of a liquid crystal display (LCD), a thin film transistor-LCD (TFT-LCD), an organic light-emitting diode (OLED), a flexible display, a field emission display (FED), and a three-dimensional (3D) display.

The communicator 130 may include a communication module for supporting a communication interface with electronics and/or control units mounted on the vehicle 10. For example, the communication module may communicatively connect with a navigation device installed in the vehicle 10 and may receive vehicle location information, destination information, information about surrounding circumstances, information about road attributes, information about road conditions, and the like from the navigation device.

Herein, the communication module may include a module for supporting vehicle network communication such as a controller area network (CAN), local interconnect network (LIN) communication, and flex-ray communication.

Further, the communicator 130 may include a global positioning system (GPS) module which receives GPS information relative to a current location of the vehicle 10.

Further, the communicator 130 may include a module for wireless Internet access or a communication module for short range communication. Herein, wireless Internet technologies may include a wireless local area network (WLAN), wireless broadband (Wibro), wireless-fidelity (Wi-Fi), world interoperability for microwave access (Wimax), and the like. Short range communication technologies may include Bluetooth, ZigBee, ultra-wideband (UWB), radio frequency identification (RFID), infrared data association (IrDA), and the like.

The sensor 140 may include one or more sensors for recognizing a driving lane of the vehicle 10. For example, the sensor 140 may include a camera and the like which capture a forward lane image and recognize a lane. The sensor 140 may include any sensor which may recognize a driving lane through lane recognition technology.

The sensor 140 may further include a sensor which measures a distance from a vehicle around the vehicle 10.

The storage 150 may store data and/or an algorithm, and the like necessary for an operation of the path control apparatus 100.

The storage 150 may store information received from a navigation device via the communicator 130. The storage 150 may store destination information and path information generated by the path generating processor 160.

Further, the storage 150 may store a command and/or an algorithm for generating a path, determining a path deviation prediction area, determining path deviation, and controlling autonomous driving and may store the result performed by the algorithm.

Herein, the storage 150 may include storage media such as a random access memory (RAM), a static RAM (SRAM), a read-only memory (ROM), a programmable ROM (PROM), and an electrically erasable PROM (EEPROM).

If information about a destination is entered, the path generating processor 160 may search for a path from a current location of the vehicle 10 to the destination to generate a global path (hereinafter referred to as "first path"). In this case, the path controller 180 may set the first path to a driving path and may control driving of vehicle 10 along the first path. The path controller 180 may provide information about the set driving path to a separate driving control system connected via the communicator 130.

If the vehicle 10 drives along the first path by control of the path controller 180, the path deviation area extracting processor 170 may determine a path deviation prediction area predicted for the vehicle 10 to deviate from the first path.

In this case, the path deviation area extracting processor 170 may extract the path deviation prediction area on the first path using information about road attributes received from the navigation device. For example, the path deviation area extracting processor 170 may extract an area, such as an entrance ramp, an exit ramp, a crossroad, a fork of a road, an underpass, or an overpass, where road attributes on a path during driving are changed, as the path deviation prediction area.

The path deviation area extracting processor 170 may store information about the extracted path deviation prediction area, for example, location information in the storage 150.

If the vehicle 10 arrives at a range from the path deviation prediction area while the vehicle 10 drives along the first path, the path controller 180 may determine whether to generate an alternative path (hereinafter referred to as "second path") from the path deviation prediction area to the destination.

Herein, the path controller 180 may determine whether to generate the second path, based on a road congestion level, for a target lane on a road where the vehicle 10 is driven or a side lane in the direction of the target lane and a location of a lane where the vehicle 10 is driven.

For example, the path controller 180 may calculate a congestion level of the target lane on the road while the vehicle 10 is driven. If the calculated congestion level of the target lane is greater than a threshold and if a lane where the vehicle 10 is currently driven is not the target lane, the path controller 180 may determine to generate the second path.

If it is determined that the second path is generated by the path controller 180, the path generating processor 160 may search for a path from the path deviation prediction area to the destination before the vehicle 10 arrives at the path deviation prediction area to generate the second path.

The path controller 180 may determine whether the vehicle 10 deviates from the first path on the previously extracted path deviation prediction area. If determining that the vehicle 10 deviates from the first path on the path deviation prediction area, the path controller 180 may set a driving path of the vehicle 10 to the previously generated second path and may control driving of the vehicle 10 along the second path. The path controller 180 may provide information about the set driving path to the separate driving control system connected via the communicator 130.

In this case, if the driving path of the vehicle 10 is set to the second path, the path generating processor 160 may search for a path to the destination again relative to a current location of the vehicle 10 while the vehicle 10 drives along the second path.

The various embodiments disclosed herein, including embodiments of the path control apparatus 100 and/or elements thereof, can be implemented using one or more processors coupled to a memory (or other non-transitory machine readable recording medium) storing computer-executable instructions for causing the processor(s) to perform the functions described above including the functions described in relation to the path generating processor 160, the path deviation area extracting processor 170, and the path controller 180.

Figure 3:
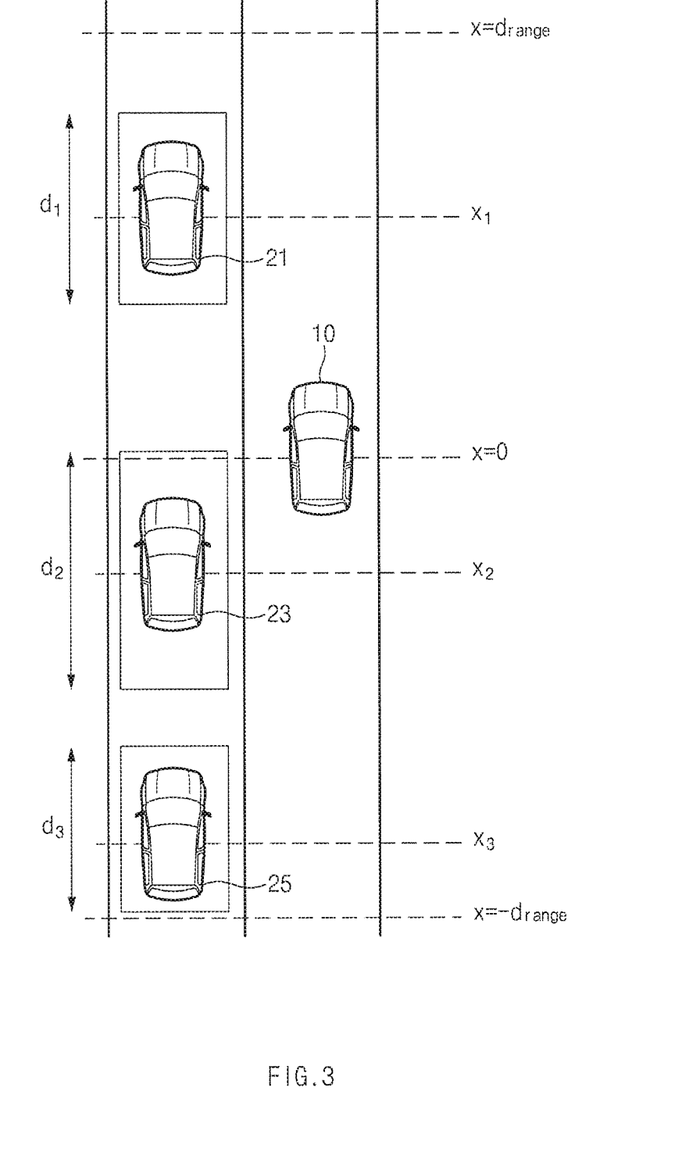
FIGS. 3 and 4 are drawings illustrating an operation of a path control apparatus of a vehicle according to an embodiment of the present disclosure.

FIG. 3 illustrates an embodiment of calculating a road congestion level.

Referring to FIG. 3, a path controller 180 of FIG. 2 may determine whether to generate a second path and whether to set a driving path, based on a distance Dtarget from a current location of a vehicle 10 to a previously extracted path deviation prediction area and a distance threshold Dthreshold. Herein, the distance threshold Dthreshold may be classified as a first distance threshold Dth1 or a second distance threshold Dth2. In this case, it is assumed that Dth1 is greater than Dth2.

If the distance dtarget from the current location of the vehicle 10 to the previously extracted path deviation prediction area is less than the second distance threshold Dth2, the path controller 180 may verify whether a current driving lane of the vehicle 10 corresponds to a target lane. If the current driving lane of the vehicle 10 is not the target lane, the path controller 180 may calculate a road congestion level for the target lane or a side road in the direction of the target lane.

The road congestion level may be calculated using Equation 1 below.

$$U = \frac{\sum_i d_i}{2 \cdot d_{range}} \quad \text{[Equation 1]}$$

In Equation 1, U may denote the road congestion level, and drange may denote an area in front and rear of the vehicle 10 relative to a current location (x=0) of the vehicle 10, for example, a range (−drange ≤x≤drange) of a lane change area. di may represent a longitudinal area of an $i^{th}$ nearby vehicle located on a side road in the lane change area of the vehicle 10. For example, d1 may represent a longitudinal area of an $1^{st}$ nearby vehicle 21 located on a side road in the lane change area of the vehicle 10, d2 may represent a longitudinal area of an $2^{nd}$ nearby vehicle 23 located on a side road in the lane change area of the vehicle 10, d3 may represent a longitudinal area of an $3^{rd}$ nearby vehicle 25 located on a side road in the lane change area of the vehicle 10.

Herein, di may be defined as Equation 2 below.

$$d_i = \begin{cases} \alpha \cdot f(v - v_i), & x_i \geq 0 \\ \alpha \cdot f(v_i - v), & x_i < 0 \end{cases} \quad \text{[Equation 2]}$$

In Equation 2, $x_i$ may denote a location of the $i^{th}$ (ex, i={1, 2, 3}) nearby vehicle located on the side road in the lane change area of the vehicle 10, and v may denote a velocity of the vehicle 10. $v_i$ may denote a velocity of the $i^{th}$ nearby vehicle, and α may denote a coefficient. For example, x1 may denote a location of the $1^{st}$ nearby vehicle 21 located on the side road in the lane change area of the vehicle 10, x2 may denote a location of the $2^{nd}$ nearby vehicle 23 located on the side road in the lane change area of the vehicle 10, x3 may denote a location of the $3^{rd}$ nearby vehicle 25 located on the side road in the lane change area of the vehicle 10. Herein, f(x) may be defined as Equation 2.

$$f(x) = \begin{cases} d_{default}, & x < 0 \\ x, & x \geq 0 \end{cases} \quad \text{[Equation 3]}$$

The path controller 180 may calculate the road congestion level using Equations 1 to 3. In this case, if the calculated road congestion level is greater than or equal to a threshold Uth, the path controller 180 may determine to generate a second path. In this case, the path controller 180 may request a path generating processor 160 of FIG. 2 to generate the second path.

Therefore, the path generating processor 160 may generate the second path based on the request of the path controller 180.

When a distance dtarget from a current location of the vehicle 10 to an extracted path deviation prediction area is less than a first distance threshold Dth1, the path controller 180 may verify whether a current driving lane of the vehicle 10 corresponds to a target lane. If the current driving lane of the vehicle 10 is not the target lane, the path controller 180 may verify whether the vehicle 10 deviates from a preset first path.

If verifying that the vehicle 10 deviates from the preset first path, the path controller 180 may reset a driving path to the previously generated second path.

Figure 4:
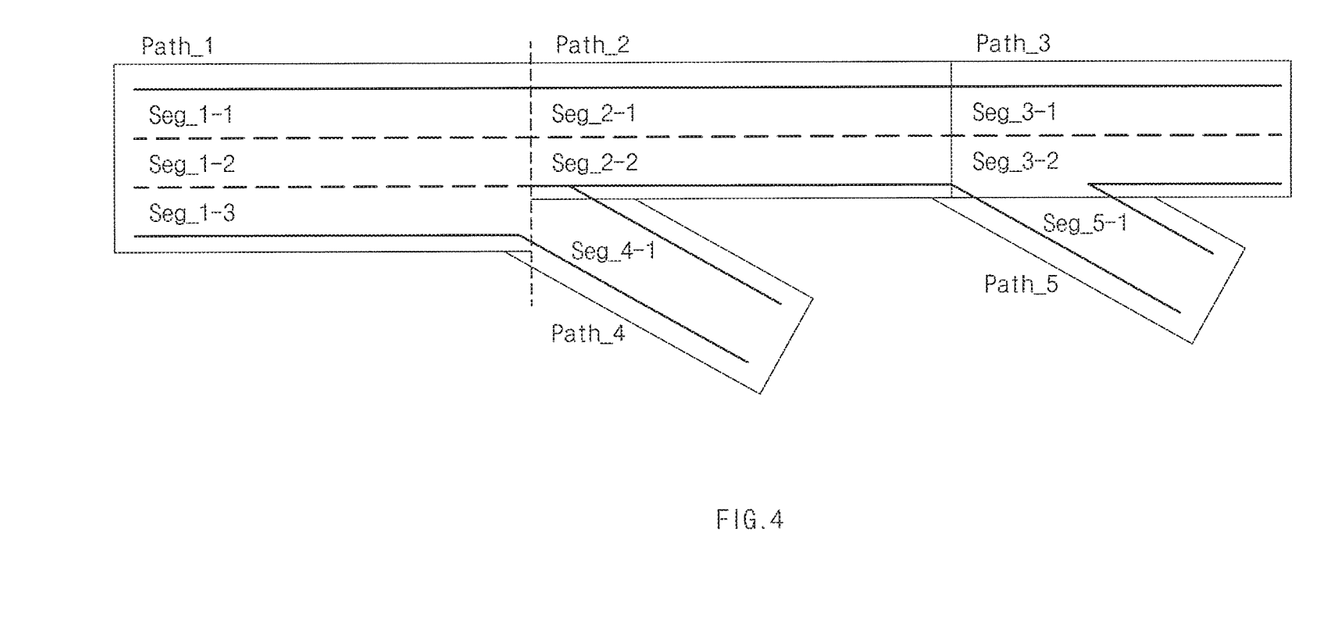

FIG. 4 illustrates an embodiment of setting a first path and a second path.

Referring to FIG. 4, a path control apparatus 100 of a vehicle 10 may set a first path such as "Path_1→Path_4→Path_a→Path_b→...". Herein, Seg_1-1, Seg_1-2, ..., Seg 5-1 of FIG. 4 may represent segment regions divided from each path region(ex, Path_1, Path_2, Path_3, Path_4, Path_5 etc.).

The path control apparatus 100 may determine a forward fork of a road as a path deviation predication area while the vehicle 10 drives along the first path and may previously set a second path as an alternative path.

In this case, the path control apparatus 100 may set the second path such as "Path_1→Path_2→Path_5→Path_i→Path_j→Path_k→...".

If path deviation occurs while the vehicle 10 moves from "Path_1" to "Path_4" on the first path, the path control apparatus 100 may set the previously generated second path to a driving path. Thus, when the vehicle 10 deviates from the first path, it may immediately drive along "Path_2→Path_5→Path_i→Path_j→Path_k→..." on the second path.

As such, the path control apparatus 100 according to an embodiment of the present disclosure may immediately react to the path deviation by previously setting the second path based on a road congestion level before the path deviation and setting the previously generated second path to a driving path upon the path deviation.

A description will be given in detail of an operation of the path control apparatus 100 according to an embodiment of the present disclosure.

Figure 5:
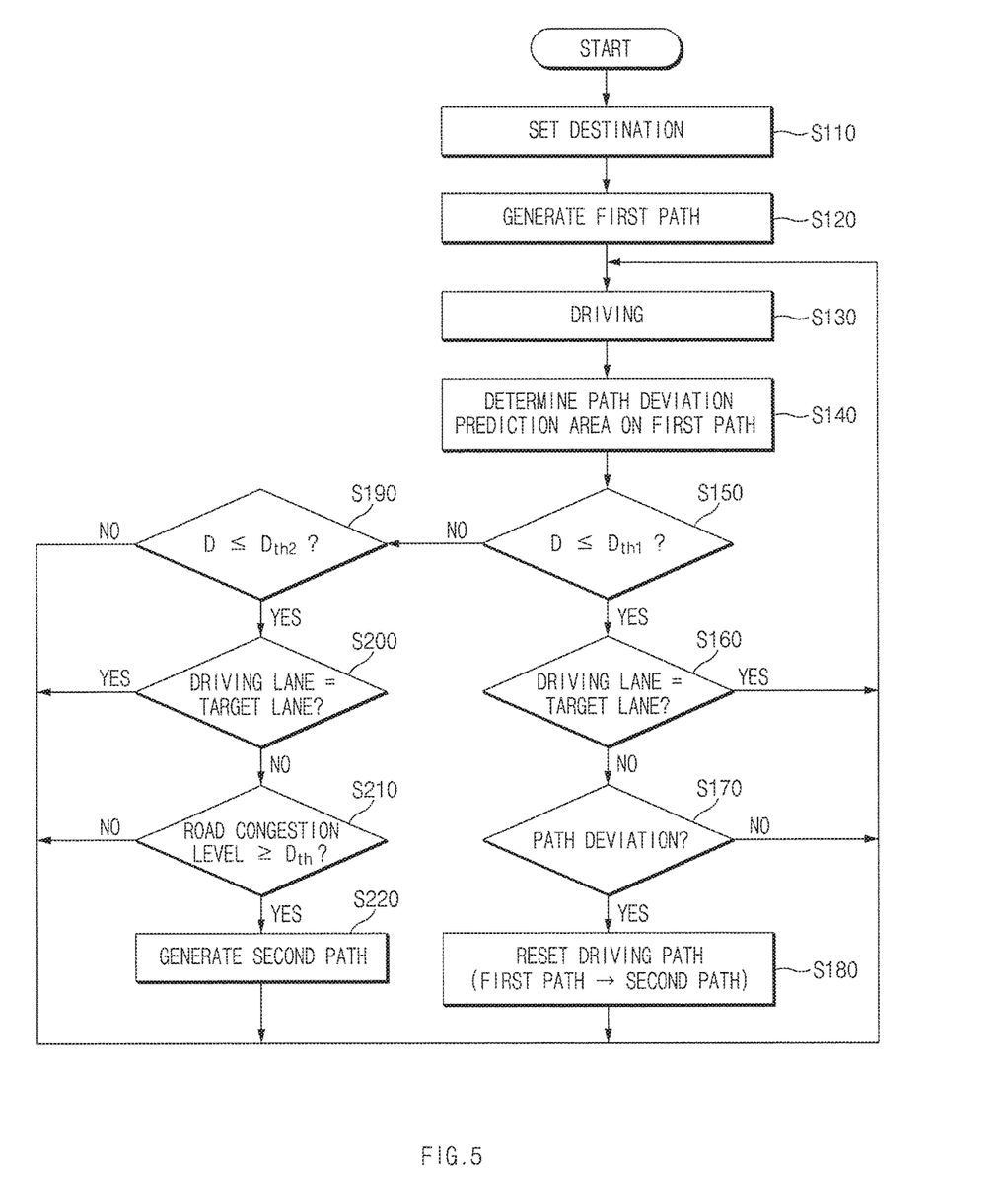
FIG. 5 is a flowchart illustrating an operation of a path control method of a vehicle according to an embodiment of the present disclosure.

FIG. 5 is a flowchart illustrating an operation of a method for controlling a path of a vehicle according to an embodiment of the present disclosure.

As shown in FIG. 5, in operation S110, a path control apparatus 100 of a vehicle 10 may set a destination when the vehicle 10 is driven. In operation S120, the path control apparatus 100 may generate a first path from a current location of the vehicle 10 to the set destination. In operation S130, the vehicle 10 may drive along the first path.

The path control apparatus 100 may extract a path deviation prediction area on the first path in advance. In this case, in operation S140, the path control apparatus 100 may determine a forward path deviation prediction area on the first path while the vehicle 10 is driven. The path control apparatus 100 may verify a distance D from a current location of the vehicle 10 to the path deviation prediction area.

In operation S150, the path control apparatus 100 may determine whether the distance D from the current location of the vehicle 10 to the path deviation prediction area is less than or equal to a first distance threshold Dth1. If the distance D is greater than the first distance threshold Dth1 in operation S150, in operation S190, the path control apparatus 100 may determine whether the distance D is less than or equal to a second distance threshold Dth2 which is more distant from the first distance threshold Dth1. If the distance D is greater than the second distance threshold Dth2 in operation S190, the path control apparatus 100 may maintain the driving of the vehicle 10 along the first path. If the distance D is less than or equal to the second distance threshold Dth2, in operation S200, the path control apparatus 100 may determine whether a driving lane of the vehicle 10 is a target lane. If the driving lane of the vehicle 10 is the target lane in operation S200, the path control apparatus 100 may maintain the driving of the vehicle 10 along the first path. If the driving lane of the vehicle 10 is not the target lane, the path control apparatus 100 may calculate a road congestion level of a road around the vehicle 10.

If the calculated road congestion level is greater than a congestion level threshold Uth in operation S210, in operation S220, the path control apparatus 100 may predict path deviation on the path deviation prediction area and may generate a second path. Information of the second path generated in operation S220 may be stored in a storage 150 of FIG. 2.

If the distance D from the current location of the vehicle 10 to the path deviation prediction area is less than or equal to the first distance threshold Dth1, in operation S160, the path control apparatus 100 may determine whether the driving lane of the vehicle 10 is the target lane.

If the driving lane of the vehicle 10 is the target lane in operation S160, the path control apparatus 100 may maintain the driving of the vehicle 10 along the first path. If the driving lane of the vehicle 10 is not the target lane in operation S160, in operation S170, the path control apparatus 100 may determine whether the vehicle 10 deviates form a driving path. When the vehicle 10 deviates from the driving path, the path control apparatus 100 may reset the driving path to the second path generated in operation S220.

If it is determined that the vehicle 10 does not deviate from the driving path in operation S170, the path control apparatus 100 may maintain the driving of the vehicle 10 along the first path.

The path control apparatus 100 according to an embodiment may be implemented in the form of an independent hardware device and may be driven in the form of being included in another hardware device such as a microprocessor or a general purpose computer system as at least one or more processors.

Figure 6:
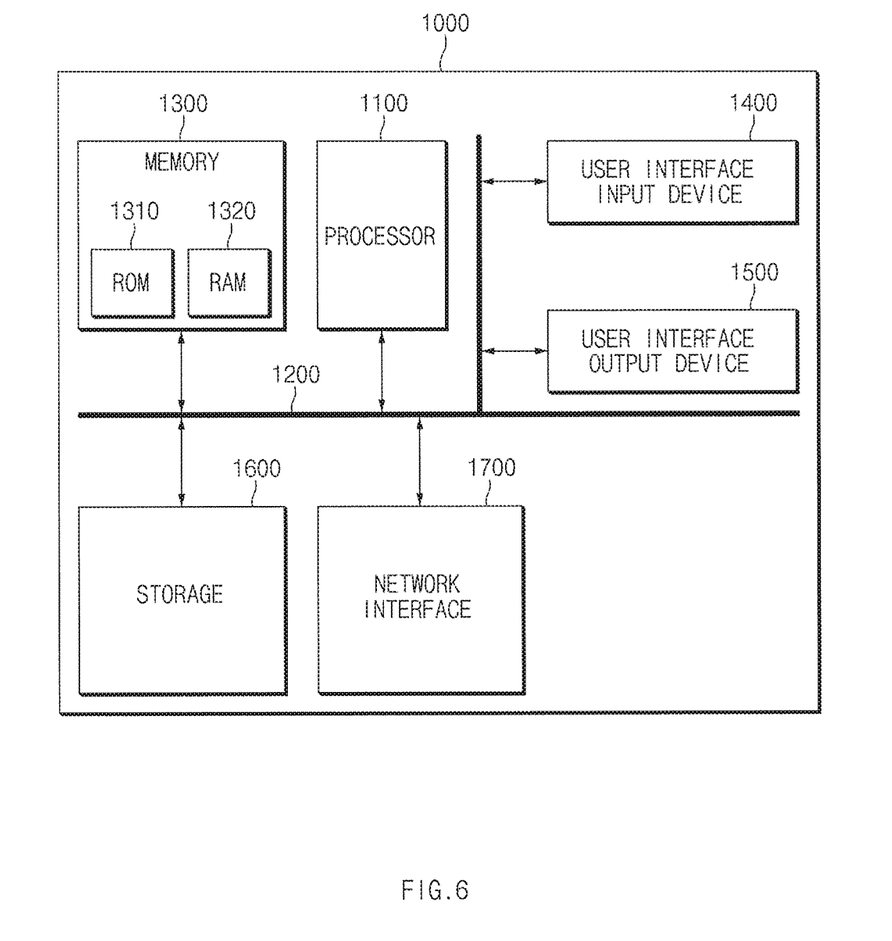
FIG. 6 is a block diagram illustrating a configuration of a computing system in which a path control method is executed, according to an embodiment of the present disclosure.

FIG. 6 is a block diagram illustrating a configuration of a computing system in which a path control method is executed, according to an embodiment of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside in a user terminal. Alternatively, the processor and storage medium may reside as a separate component of the user terminal.

According to various embodiments, the path control apparatus may flexibly respond to an unexpected situation by determining whether there is a path deviation prediction area on a preset path, detecting path deviation on the corresponding area in advance, and previously searching for an alternative path before the path deviation such that the vehicle drives along the alternative path although the vehicle deviates from a path on the path deviation predication area.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for controlling a path of a vehicle, the apparatus comprising:
    a path generating processor configured to generate a first path by searching for a path from a current location of the vehicle to a destination and to generate a second path by searching for a path from a path deviation prediction area on the first path to the destination;
    a path deviation area extracting processor configured to extract the path deviation prediction area based on road attributes on the first path when a driving path of the vehicle is set to the first path; and
    a path controller configured to determine whether to generate the second path based on a congestion level of a road around the vehicle when the vehicle arrives at a range from the extracted path deviation prediction area on the first path, reset the driving path of the vehicle to the second path, and control driving of the vehicle along the second path when a path deviation occurs on the extracted path deviation prediction area.

2. The apparatus of claim 1, wherein the path deviation area extracting processor is configured to:
    extract an area, where attributes information of a road while the vehicle is driven is changed on the first path, as the path deviation prediction area.

3. The apparatus of claim 2, wherein the path deviation area extracting processor is configured to:
    extract an area, where one of an entrance ramp, an exit ramp, a crossroad, a fork of the road, an underpass, and an overpass is located on the first path, as the path deviation prediction area.

4. The apparatus of claim 1, wherein the path controller is configured to:
    determine whether a driving lane of the vehicle corresponds to a target lane on the first path, when the vehicle arrives at the range from the extracted path deviation predication area on the first path.

5. The apparatus of claim 4, wherein the path controller is configured to:
    calculate a road congestion level for the target lane or a side lane in a direction of the target lane, when the driving lane of the vehicle does not correspond to the target lane on the first path.

6. The apparatus of claim 5, wherein the path controller is configured to:
    calculate the road congestion level using location, velocity, and length information of surrounding vehicles around the vehicle, which exist in an area in front and rear of the vehicle, among the surrounding vehicles around the vehicle on the target lane or the side lane in the direction of the target lane.

7. The apparatus of claim 6, wherein the path controller is configured to:
    calculate the road congestion level using a value in which a sum of length areas of the surrounding vehicles, which exist in the area in front and rear of the vehicle, among the surrounding vehicles on the target lane or the side lane in the direction of the target lane is divided by a length of the area in front and rear of the vehicle.

8. The apparatus of claim 5, wherein the path controller is configured to:
    determine that the second path is generated, when the road congestion level is greater than or equal to a threshold; and
    request the path generating processor to generate the second path.

9. The apparatus of claim 1, further comprising:
    a storage configured to store information of the first path and the second path.

10. A method for controlling a path of a vehicle, the method comprising:
    generating, by a path generating processor, a first path by searching for a path from a current location of the vehicle to a destination;
    extracting, by a path deviation area extracting processor, a path deviation prediction area based on road attributes on the first path, when a driving path of the vehicle is set to the first path;
    generating, by the path generating processor, a second path from the extracted path deviation prediction area to the destination based on a congestion level of a road around the vehicle, when the vehicle arrives at a range from the extracted path deviation prediction area on the first path;
    resetting, by a path controller, the driving path of the vehicle along the second path, when a path deviation occurs on the extracted path deviation prediction area; and
    controlling, by the path controller, driving of the vehicle along the second path.

11. The method of claim 10, wherein the extracting of the path deviation predication area comprises:
    extracting an area, where attributes information of a road while the vehicle is driven is changed on the first path, as the path deviation prediction area.

12. The method of claim 11, wherein the extracting of the path deviation predication area comprises:

extracting an area, where one of an entrance ramp, an exit ramp, a crossroad, a fork of the road, an underpass, and an overpass is located on the first path, as the path deviation prediction area.

13. The method of claim 10, further comprising:
determining whether a driving lane of the vehicle corresponds to a target lane on the first path, when the vehicle arrives at the range from the extracted path deviation predication area on the first path.

14. The method of claim 13, further comprising:
calculating a road congestion level for the target lane or a side lane in the direction of the target lane, when the driving lane of the vehicle does not correspond to the target lane on the first path.

15. The method of claim 14, wherein the calculating of the road congestion level comprises:
calculating the road congestion level using location, velocity, and length information of surrounding vehicles around the vehicle, which exist in an area in front and rear of the vehicle, among the surrounding vehicles on the target lane or the side lane in the direction of the target lane.

16. The method of claim 15, wherein the calculating of the road congestion level comprises:
calculating the road congestion level using a value in which the sum of length areas of the surrounding vehicles, which exist in the area in front and rear of the vehicle, among the surrounding vehicles on the target lane or the side lane in the direction of the target lane is divided by a length of the area in front and rear of the vehicle.

17. The method of claim 14, wherein the generating of the second path comprises:
generating the second path, when the road congestion level is greater than or equal to a threshold.

18. The method of claim 10, further comprising:
storing information of the generated second path.

* * * * *